(12) United States Patent
Miller et al.

(10) Patent No.: US 8,474,602 B2
(45) Date of Patent: Jul. 2, 2013

(54) MULTI-PIECE CONVEYOR BELT ROLLERS

(75) Inventors: Abraham L. Miller, Gulfport, MS (US); Gibert J. MacLachlan, Harahan, LA (US)

(73) Assignee: Laitram, Harahan (LA)

( * ) Notice: Subject to any disclaimer, the term of this patent is extended or adjusted under 35 U.S.C. 154(b) by 123 days.

(21) Appl. No.: 13/113,517

(22) Filed: May 23, 2011

(65) Prior Publication Data

US 2012/0298485 A1    Nov. 29, 2012

(51) Int. Cl.
*B65G 17/24* (2006.01)

(52) U.S. Cl.
USPC .............................................. 198/779; 193/37

(58) Field of Classification Search
USPC ..................... 198/834, 835, 842, 779; 193/37
See application file for complete search history.

(56) References Cited

U.S. PATENT DOCUMENTS

| | | | | |
|---|---|---|---|---|
| 569,663 | A | * | 10/1896 | Perkins ........................... 474/95 |
| 1,758,280 | A | * | 5/1930 | Evans ............................. 193/37 |
| 3,657,779 | A | * | 4/1972 | Granberry ..................... 198/842 |
| 4,993,540 | A | | 2/1991 | van Cappelleveen |
| 6,146,299 | A | | 11/2000 | Harvey |
| 6,494,312 | B2 | | 12/2002 | Costanzo |
| 6,527,106 | B2 | * | 3/2003 | Tanabe et al. .................. 198/853 |
| 6,874,617 | B1 | | 4/2005 | Layne |
| 6,923,309 | B2 | * | 8/2005 | Costanzo ....................... 198/411 |
| 7,137,505 | B2 | * | 11/2006 | Stebnicki et al. .............. 198/850 |
| 7,331,448 | B2 | | 2/2008 | Stebnicki et al. |
| 7,527,143 | B2 | | 5/2009 | Krisl et al. |
| 7,540,368 | B2 | | 6/2009 | Weiser |
| 7,886,892 | B2 | | 2/2011 | Fourney |
| 8,146,733 | B2 | * | 4/2012 | Fox ................................ 198/780 |
| 2006/0011454 | A1 | * | 1/2006 | Stebnicki et al. .............. 198/779 |
| 2008/0243046 | A1 | * | 10/2008 | Cettina et al. .................... 604/15 |
| 2012/0024658 | A1 | * | 2/2012 | Fox .................................. 193/37 |

OTHER PUBLICATIONS

Schaefer Legendary Strength Snapfurl CF-700 Owners Manual, Sep. 8, 2003, Schaefer Marine Inc., New Bedford, MA.

* cited by examiner

*Primary Examiner* — Gene Crawford
*Assistant Examiner* — Keith R Campbell
(74) *Attorney, Agent, or Firm* — James T. Cronvich

(57) ABSTRACT

Multi-piece rollers for a conveyor belt. First and second roller sections fit together to form a complete roller. The two roller sections together define a bore for receiving an axle. The bore and the periphery of the roller are formed in part by each of the first and second roller sections. The roller is assembled by sliding the two sections together in a direction perpendicular to the axle with the bore closing around the axle. The roller sections have fingers that interdigitate with each other to prevent axial separation of the first and second roller sections. The interdigitated fingers surround a majority of the bore.

19 Claims, 4 Drawing Sheets

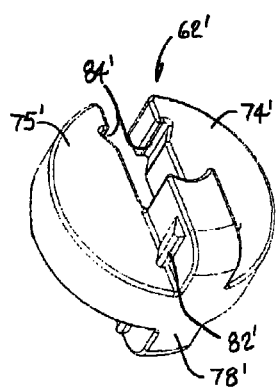
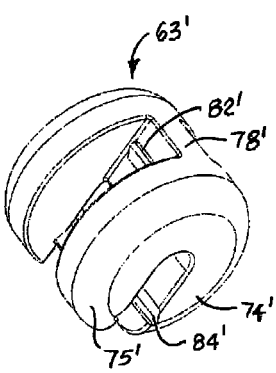
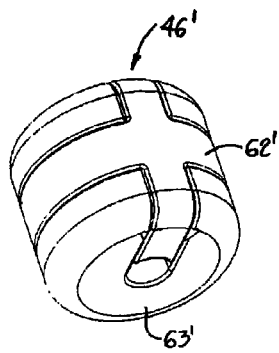
FIG. 6A     FIG. 6B     FIG. 6C
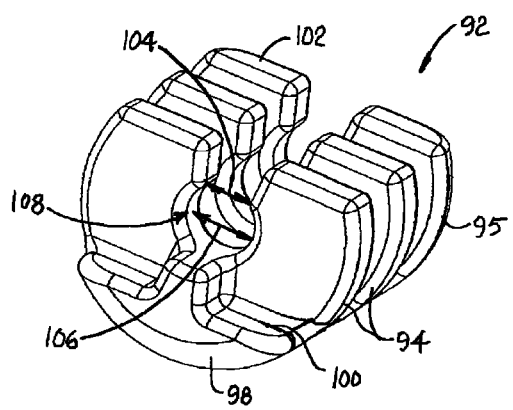
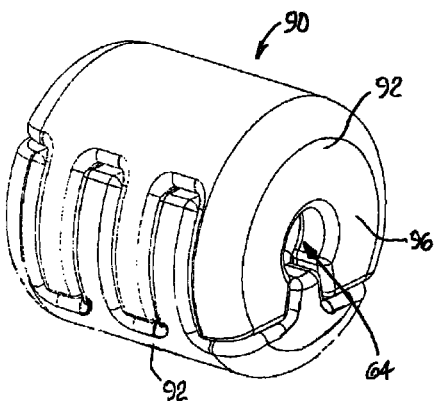
FIG. 7A        FIG. 7B
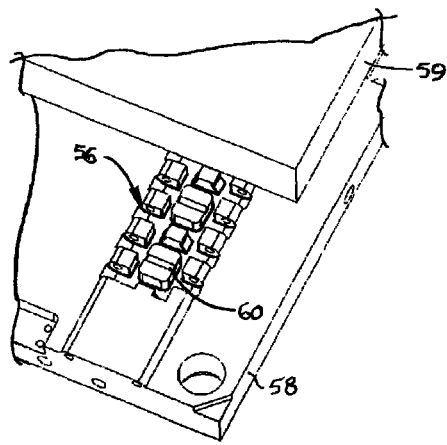
FIG. 8

MULTI-PIECE CONVEYOR BELT ROLLERS

BACKGROUND

The invention relates generally to power-driven conveyors and more particularly to multi-piece article-supporting rollers for conveyor belts.

Article-supporting rollers are used in modular plastic conveyor belts to provide low-friction rolling support to conveyed articles. In many roller-top belts, the rollers are mounted on steel axles in cavities formed in the belt modules used to construct the modular belt. Roller-top belt modules with steel axles are more difficult to manufacture than standard modules without rollers. One way to manufacture a roller-top module is to injection-mold the module around a roller on a steel axle. The ends of the axle extend into the mold and are encapsulated in the molded module body. Another way is to injection-mold a module body with a receptacle for a roller. Then, in a secondary manufacturing step, a roller and axle are placed in each receptacle, and a cover is welded or otherwise retained in place over the ends of the axle to hold the roller in the module. Thus, there is a need to simplify the manufacture of roller-top belts.

SUMMARY

A multi-piece roller embodying features of the invention and usable in a conveyor belt comprises first and second roller sections that fit together to form a complete roller. The complete roller has an outer periphery between opposite ends. Together, the first and second roller sections define a bore that extends along the central axis of the roller and opens onto the opposite ends for receiving an axle. The bore is formed in part by each of the first and second roller sections. At least one first interdigitating member on the first roller section and at least two second interdigitating members on the second roller section interdigitate with each other. The two sections are assembled by sliding the two sections together in a direction perpendicular to the central axis of the complete roller. The interdigitated first and second interdigitating members prevent axial separation of the first and second roller sections.

BRIEF DESCRIPTION OF THE DRAWINGS

These aspects and features of the invention, as well as its advantages, are described in more detail in the following description, appended claims, and accompanying drawings, in which:

FIGS. 6A-6C are axonometric views of a first roller piece, a second roller piece, and another complete roller usable in a conveyor belt module as in FIG. 3;

FIGS. 7A and 7B are axonometric views of a roller piece and another complete roller usable in a conveyor belt module as in FIG. 3; and FIG. 8 is an isometric view of a mold for a conveyor belt module as in FIG. 3;

DETAILED DESCRIPTION

Figure 1:
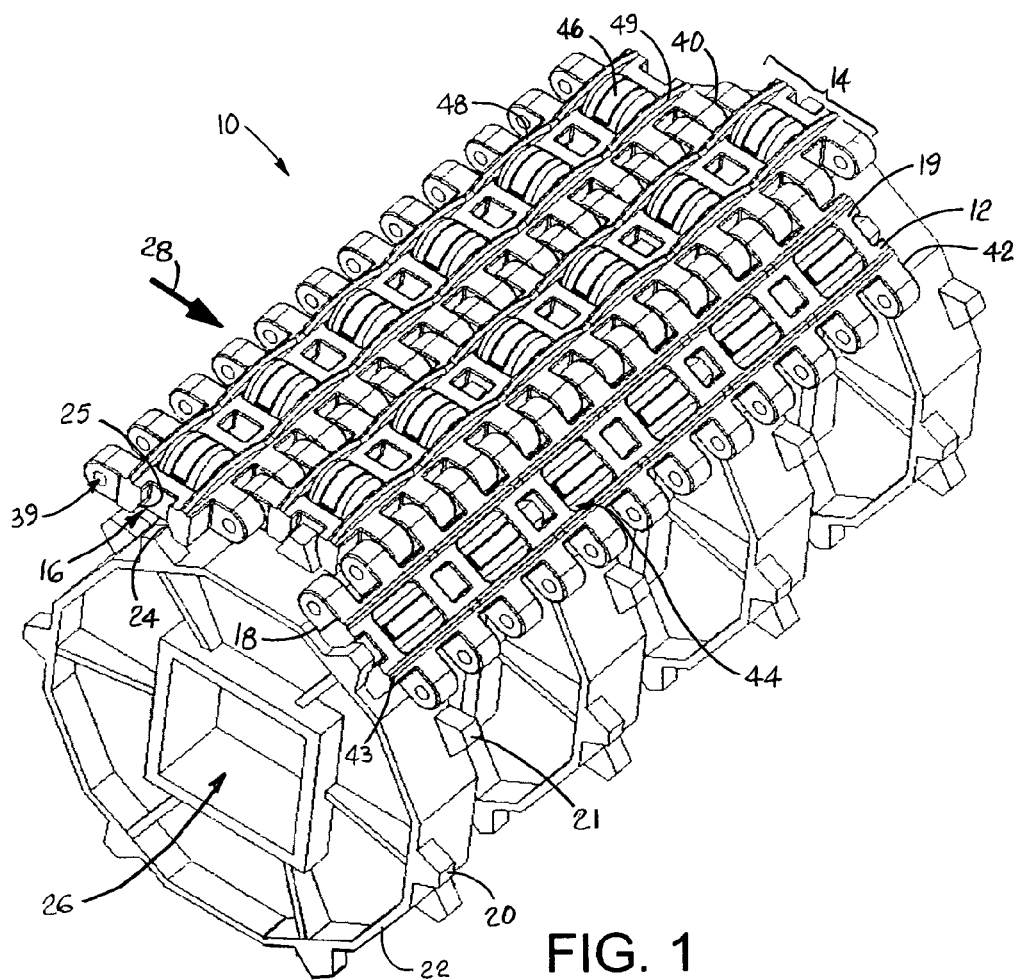
FIG. 1 is an isometric view of a portion of a modular plastic conveyor belt embodying features of the invention.

A portion of a conveyor belt embodying features of the invention is shown in FIG. 1. The portion of the modular conveyor belt 10 shown is an interior portion. Three conveyor belt modules 12 are connected together in three belt rows 14. The modules are shown offset laterally from row to row in a bricklay pattern. Although only one module 12 is shown in each row 14, other similar modules are connected side by side in each row to form an endless conveyor belt. Drive pockets 16 opening onto bottom sides 18 of the modules admit teeth 20, 21 of drive or idle sprockets 22. The teeth 20, 21 of drive sprockets drive against leading drive surfaces 24 bounding the pockets. The teeth 20, 21 of idle sprockets are driven by trailing drive surfaces 25 bounding the pockets opposite the leading drive surfaces. The teeth are arranged in two groups around the periphery of each of the sprockets. Each group is laterally offset from the other across the width of the sprocket. The teeth 20 in a first group are staggered circumferentially from the teeth 21 in a second group, with the teeth in each group spaced at twice the pitch of the conveyor belt. In this way, the teeth are positioned to engage the drive pockets 16, which are laterally offset from row to row. The teeth 20 in the first group engage all the even rows, and the teeth 21 in the second group engage all the odd rows. The endless belt is trained around idle and drive sprocket sets, which are mounted on shafts (not shown) received in bores 26 of the sprockets. The shaft of the drive sprockets is rotated by a motor and gear box (not shown) to drive the belt in a direction of travel 28.

Figure 2:
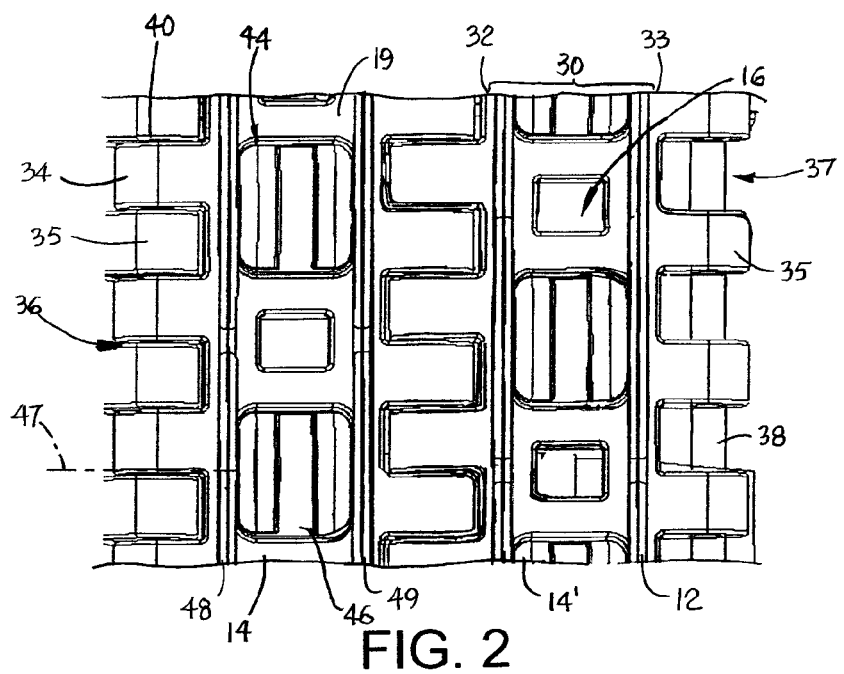
FIG. 2 is a top plan view of a portion of the conveyor belt of FIG. 1.

As shown in FIG. 2, each module 12 has an intermediate portion 30 that extends from a first end 32 to an opposite second end 33 defining the length of the module. The module extends in width from a first side edge 42 to an opposite second side edge 43. The thickness of the module is measured from the bottom side 18 to an opposite top side 19. Hinge elements of a first set 34 are spaced apart laterally along the first end 32, and hinge elements of a second set 35 are spaced apart laterally along the second end 33. First and second gaps 36, 37 between the hinge elements of the first and second sets 34, 35 are sized to allow the first set of hinge elements of one row to interleave with the second set of hinge elements of an adjacent row. Hinge pins 38 through aligned openings 39 in the interleaved hinge elements connect adjacent rows together at hinge joints 40 in the endless belt 10.

Each belt module 12 has one or more cavities 44 that open onto the top side 19 of the module. In the version of module shown in FIG. 2, the cavities also open onto the bottom side 18 and are alternately positioned across the width of the intermediate portion with the drive pockets 16, which are shown opening onto the top side 19, too. A belt roller 46 is mounted in each cavity for rotation on an axis 47 parallel to the length of the intermediate portion. The rollers 46 on one row 14 are shown offset in the width direction from those in an adjacent row 14' for more even article support. The lateral offset from row to row means that the drive pockets 16 are also laterally offset from row to row. The laterally offset and circumferentially staggered groups of teeth 20, 21 on the sprockets accommodate the offset roller arrangement. Salient portions of the rollers 46 extend above the top side 19 of the belt into a supporting position for conveyed articles.

First and second parallel ridges 48, 49 extend laterally across the width of the module along the first and second ends 32, 33. The ridges increase the module's beam stiffness. The ridges shown are wavy, their height above the top side varying across the width of the module. The height of the ridges is at a maximum at the position of the roller cavities 44. But the peak of the ridges is below the tops of the rollers. The height of the ridges decreases to a minimum midway between cavity positions in the module. In this way, the bottoms of conveyed articles are guaranteed to ride atop the rollers, and trip points on the ridges are minimized.

Figure 3:
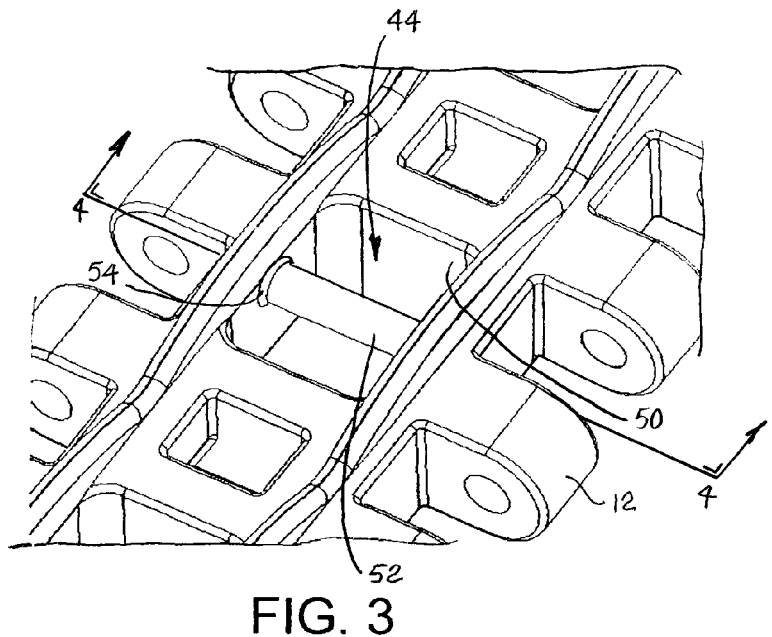
FIG. 3 is an enlarged isometric view of the top surface of a module of a conveyor belt as in FIG. 1.
Figure 4:
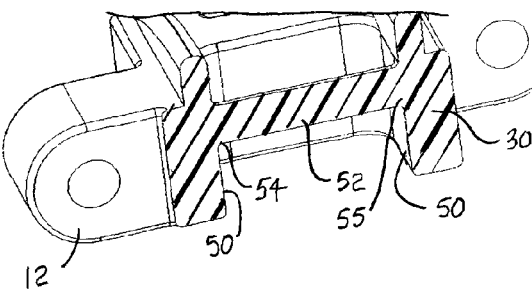
FIG. 4 is an axonometric cross section of the module of FIG. 3 taken along lines 4-4.

A portion of the belt module 12 without a roller is shown in FIG. 3. The roller cavity 44 in the intermediate portion 30 is bounded by a perimetric wall 50. An axle 52 for the rollers extends diametrically across the cavity. The ends 54 of the axle terminate at opposite positions on the wall. As shown in cross section in FIG. 4, the axle 52 is formed unitarily with the intermediate portion 30 of the module 12, its ends 54, 55 continuous with the wall 50 and the rest of the module. In this example, the axle's axis (47, FIG. 2) is parallel to the length of the intermediate portion 30 so that the roller rotates transverse to the direction of travel. But the axle 52 could be formed in the cavity at other angles, such as with its axis of rotation parallel to the width of the direction of the intermediate portion to rotate in or opposite to the direction of travel.

Figure 9:
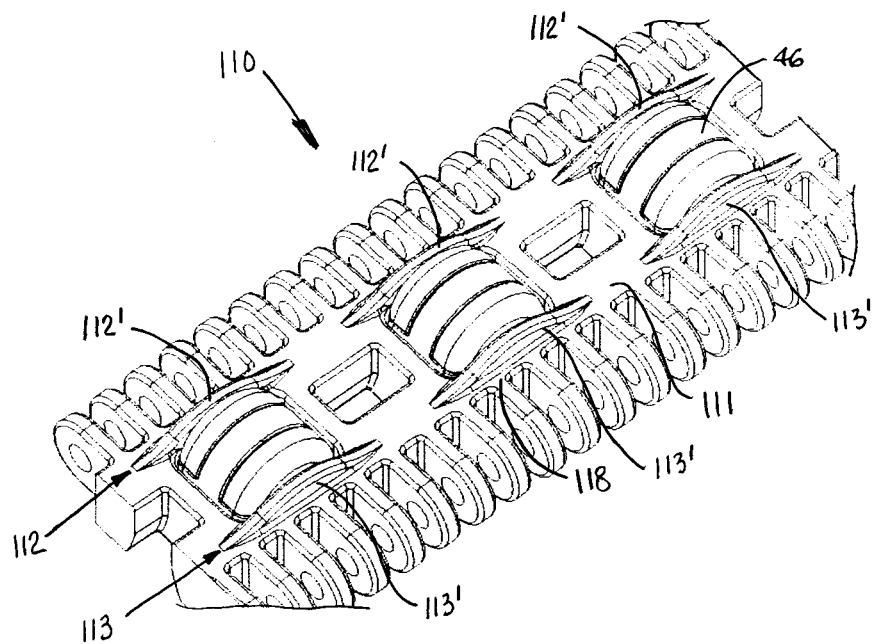
FIG. 9 is an isometric view from the top side of a portion of another version of conveyor belt module usable to make a conveyor belt as in FIG. 1.
Figure 10:
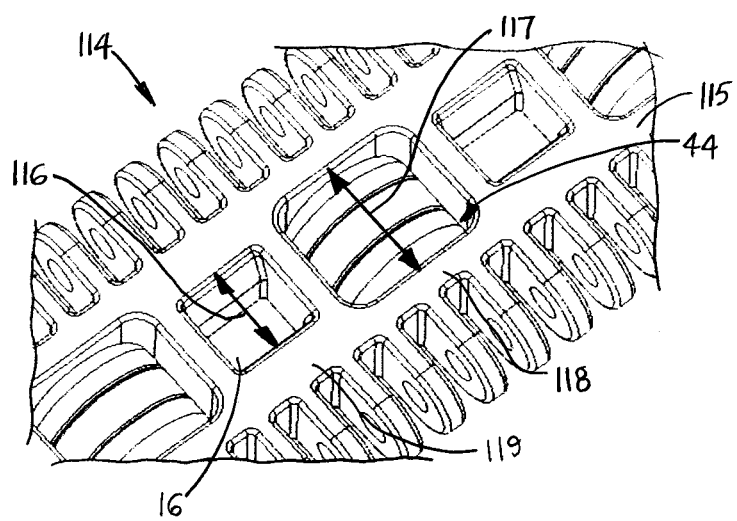
FIG. 10 is an isometric view of a portion of the bottom side of the conveyor belt module of FIG. 9.

Another version of a conveyor belt module that can be used to construct stiff roller-top belts is shown in FIGS. 9 and 10 from the top and bottom sides. The conveyor belt module 110, which is similar to the belt module 12 of FIG. 3, has on its top side 111 first and second ridges 112, 113 that are segmented across the width of the intermediate portion of the module into individual ridge segments 112', 113' whose maximum heights coincide with the positions of the rollers 46. As seen from the bottom side 115 of the module in FIG. 10, the length dimension 116 of the drive pockets 16 is less than the length dimension 117 of the roller cavities 44, which means that the beam portions 118 between the hinge elements and the cavities are thinner than the beam portions 119 between the hinge elements and the drive pockets 16. The ridge segments 112', 113' on the top side of the thinner beam portions 118 add stiffness to those thinner portions.

One way of manufacturing the module is shown in FIG. 8. A molten thermoplastic polymer, such as polypropylene, polyethylene, acetyl, or a composite polymer, is injected into a cavity region 56 of a closed mold consisting of two mold halves 58, 59 (shown separated). (The axle and cavity portion 60 of one half of the mold is shown in FIG. 8.) Once the mold cavity is filled, heat and pressure are applied to the joined mold halves to mold the module. The mold halves are parted and the molded module ejected. In this way, the axle is molded unitarily with the intermediate portion of the module.

Figure 5A:
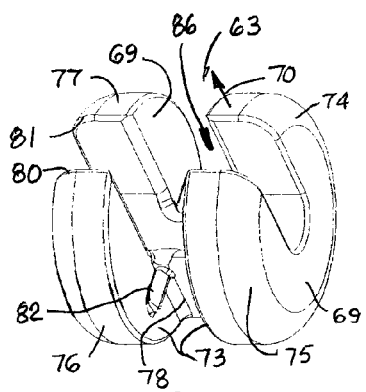
FIGS. 5A-5C are oblique views of first and second roller pieces and a complete roller usable in a conveyor belt module as in FIG. 3.
Figure 5B:
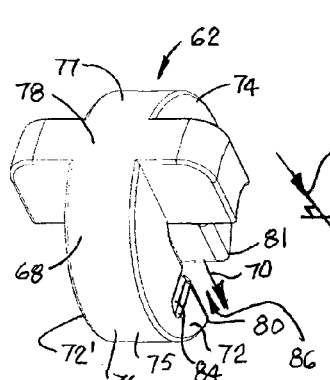
Figure 5C:
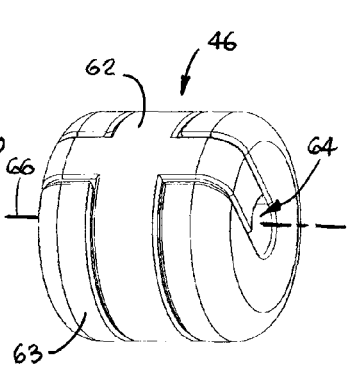

Because the axles 52 are unitarily molded with the modules and both ends 54, 55 of the axles are continuous with the walls 50, the belt rollers 46 cannot be axially inserted onto the axles. FIGS. 5A-5C show one version of a multi-piece roller 46. The roller consists of two different pieces: a first roller section 62 and a second roller section 63. The two sections are inserted radially onto the axle and joined together like three-dimensional puzzle pieces. When joined, the two roller sections form the complete roller 46 with a central bore 64 along a central axis 66 of the roller. The first roller section 62 has a first interdigitating member 68 that interdigitates with a pair of second interdigitating members 69 on the second roller section 63 to form the complete roller 46. The complete roller is assembled by sliding the two roller sections 62, 63 together in a radial direction 70 perpendicular to the central axis 66.

Each of the interdigitating members 68, 69 has a lateral face 72 in contact with a lateral face 73 of an adjacent interdigitated member. In this example, the outward facing lateral faces 72, 72' of the first roller section 62 contact the inward-facing lateral faces 73 of the second roller section 63. The axially overlapped faces prevent axial separation of the two interdigitated roller sections. Each of the interdigitating members 68, 69 has a pair of fingers 74, 75 on opposite sides of the bore 64. Each finger 74, 75 forms a portion 76, 77 of the outer periphery of the complete roller 46. The fingers extend from a cap member 78 out to distal ends 80, 81. Like the fingers, the cap members form a portion of the periphery of the complete roller. The interdigitated roller sections are retained together by locking means in the form of locking ears 82 formed on the lateral faces 73 of the second roller section 63 in cooperation with matching detents 84 formed in the lateral faces 72, 72' of the first roller section 62. The ears snap in place in the detents to lock the roller on the axle and prevent it from radially separating in operation. The first and second roller sections 62, 63 surround less than 360° of the bore and form a gap 86 opening into the bore that is wide enough to admit an axle radially into the bore. In this example, the interdigitating members surround about 180° of the bore.

Another version of a multi-piece belt roller is shown in FIGS. 6A-6C. The complete roller 46' is externally identical to the roller 46 of FIG. 5C. The only difference is the locking means in which locking ears 82' are formed on the cap members 78' of the first and second roller sections 62', 63' and mating detents 84' are formed in the fingers 74', 75'.

Yet another version of a multi-piece roller that is usable in a conveyor belt as in FIG. 1 is shown in FIGS. 7A and 7B. In this version, the complete roller 90 consists of two identical roller sections 92. Each roller section in this example has three interdigitating members: two internal members 94 and an end member 95. The interdigitating members are identical except that the end member 95 has a rounded outer face 96 that forms an end of the complete roller 90. Like the rollers of FIGS. 5 and 6, the roller 90 has a cap portion 98 that forms a portion of the outer periphery of the roller across its entire axial length. The interdigitating members 94, 95 extend from a flat base 100 of the cap member 98 to flat distal ends 102. When the complete roller is assembled as in FIG. 7B, the distal ends of the interdigitating members rest on the flat base of the cap member of the other roller section. Because the cap members are opposite each other, they help prevent impulse or shock loads from separating the roller sections. The interdigitating members 94, 95 of each roller section 92 in this roller surround more than 180° of the bore 64. Unlike the rollers of FIGS. 5 and 6, the roller 90 has gaps 104 leading into the bore 64 that, at their narrowest, are narrower than the bore's diameter 106. The restricted opening into the bore portion 108 allows each roller section to snap onto an axle whose diameter is slightly greater than the width of the gaps 104.

Other locking means for locking the two roller sections together include adhesive-bonding, sonic welding, and other conventional mechanical and chemical fastening techniques. Furthermore, each of the roller sections could be molded out of more than one material to provide desirable operating characteristics and a variety of outer periphery textures.

What is claimed is:

1. A multi-piece roller for a conveyor belt, comprising:
first and second roller sections that fit together to form a complete roller with an outer periphery between opposite ends;
the first and second roller sections together defining a bore extending along the central axis of the roller and opening onto the opposite ends for receiving an axle, wherein the bore is formed in part by each of the first and second roller sections;

at least one first interdigitating member on the first roller section and at least two second interdigitating members on the second roller section that interdigitate with each other for assembling the two sections by sliding the two sections together in a direction perpendicular to the central axis of the complete roller, wherein the interdigitated first and second interdigitating members prevent axial separation of the first and second roller sections;

wherein each of the at least one first interdigitating members and each of the at least two second interdigitating members spans the bore.

2. A multi-piece roller as in claim 1 wherein the first and second interdigitating members have lateral faces parallel to the opposite ends and wherein each lateral face of a first interdigitating member is in contact with one of the lateral faces of an adjacent interdigitated second lateral member.

3. A multi-piece roller as in claim 1 wherein each of the first and second interdigitating members includes a pair of fingers, wherein one finger of the pair of fingers resides on the opposite side of the bore from the other finger of the pair of fingers.

4. A multi-piece roller as in claim 3 wherein each of the fingers forms a portion of the outer periphery of the complete roller.

5. A multi-piece roller as in claim 1 wherein each of the first and second rollers sections has a cap member from which the first and second interdigitating members extend.

6. A multi-piece roller as in claim 5 wherein the cap member forms part of the outer periphery of the complete roller.

7. A multi-piece roller as in claim 5 wherein the cap member of the first roller section is diametrically opposite the cap member of the second roller section in the complete roller.

8. A multi-piece roller as in claim 5 wherein the cap members each have a flat base from which the interdigitating members extend and wherein the interdigitating members have distal ends and wherein the distal ends of the at least one first interdigitating member rest on the flat base of the cap member of the second roller section and the distal ends of the second interdigitating member rest on the flat base of the cap member of the first roller section in the complete roller.

9. A multi-piece roller as in claim 1 wherein the first and second roller sections are identical.

10. A multi-piece roller as in claim 1 wherein the first and second roller sections are bonded together to form the complete roller.

11. A multi-piece roller as in claim 1 further comprising locking means for locking the first roller section to the second roller section.

12. A multi-piece roller as in claim 11 wherein the locking means comprises detents in one of the first and second roller sections and locking ears in the other of the first and second roller sections that are received in the detents to lock the roller sections together to form the complete roller.

13. A multi-piece roller as in claim 1 wherein the first and second interdigitating members surround less than 360° of the bore and form a gap opening into the bore that is wide enough to admit an axle into the bore.

14. A multi-piece roller as in claim 1 wherein the first and second interdigitating members surround more than 180° and less than 360° of the bore and form a gap that is slightly narrower than the diameter of an axle to allow the axle to be snapped into the bore through the gap.

15. A multi-piece roller as in claim 1 wherein each of the first and second roller sections are molded of two materials.

16. A multi-piece roller for a conveyor belt, comprising:

first and second roller sections that fit together to form a complete roller with an outer periphery between opposite ends;

the first and second roller sections together defining a bore extending along the central axis of the roller and opening onto the opposite ends for receiving an axle, wherein the bore is formed in part by each of the first and second roller sections, wherein each of the first and second roller sections includes:

a cap member extending parallel to the central axis and forming a first portion of the outer periphery and of the bore;

a first finger extending from the cap member and forming a second portion of the bore and of the outer periphery;

a second finger extending from the cap member on the opposite side of the bore from the first finger, the second finger forming a third portion of the bore and of the periphery formed by the first finger, wherein the first finger and the second finger are the same shape.

17. A multi-piece roller as in claim 16 wherein the first finger is offset from the second finger along the central axis of the bore.

18. A multi-piece roller as in claim 16 wherein the first finger is aligned with the second finger along the central axis of the bore.

19. A multi-piece roller for a conveyor belt, comprising:

first and second roller sections that fit together to form a complete roller with an outer periphery between opposite ends;

the first and second roller sections together defining a bore extending along the central axis of the roller and opening onto the opposite ends for receiving an axle, wherein the bore is formed in part by each of the first and second roller sections, wherein each of the first and second roller sections includes:

a first finger forming a portion of the bore and of the outer periphery;

a second finger forming a portion of the bore and of the outer periphery on the opposite side of the bore from the first finger, wherein the first finger and the second finger form 180° or more of the circumference of the bore.

* * * * *